G. R. CALEY.
MASKING ATTACHMENT FOR PHOTOGRAPHIC FINDERS.
APPLICATION FILED JULY 16, 1919.
1,347,681.
Patented July 27, 1920.
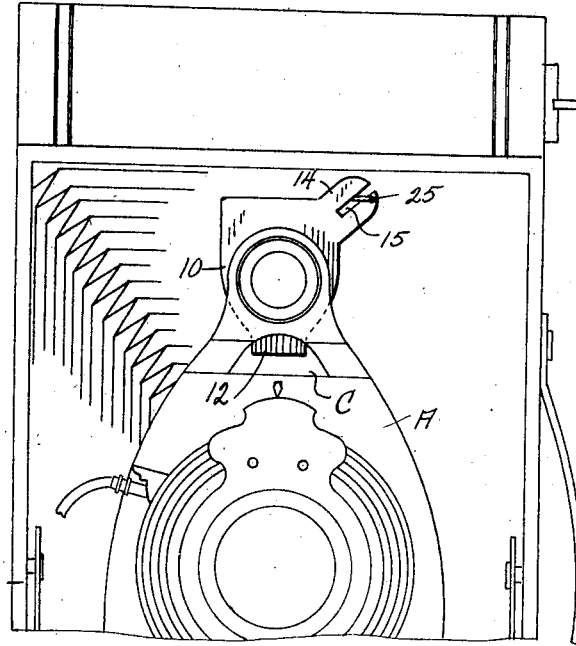
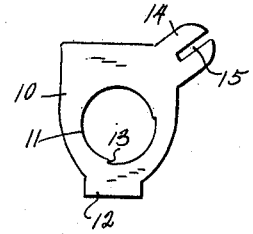
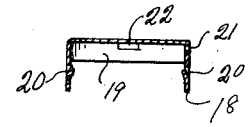
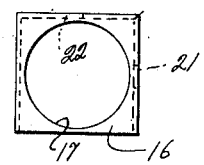
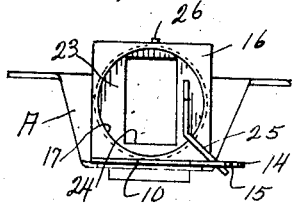
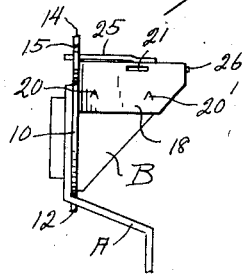
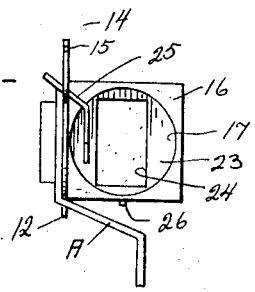
Inventor
G. R. Caley
By Watson E. Coleman
Attorney

UNITED STATES PATENT OFFICE.

GUY R. CALEY, OF SILESIA, MONTANA.

MASKING ATTACHMENT FOR PHOTOGRAPHIC FINDERS.

1,347,681.  Specification of Letters Patent.  Patented July 27, 1920.

Application filed July 16, 1919. Serial No. 311,214.

*To all whom it may concern:*

Be it known that I, GUY R. CALEY, a citizen of the United States, residing at Silesia, in the county of Carbon and State of Montana, have invented certain new and useful Improvements in Masking Attachments for Photographic Finders, of which the following is a specification, reference being had to the accompanying drawings.

This invention relates to the view finders of photographic cameras, and particularly to view finders which are pivoted upon the camera so as to be capable of being turned through a quarter revolution and permit the view finder to be used either for horizontal views or vertical views, that is permit the camera to be used for taking views whose longer axis is vertical or horizontal.

One form of view finder is circular, that is the field of the view finder is circular, and inasmuch as the picture to be taken is rectangular, it is obvious that it is impossible to accurately determine the boundaries of the picture in such a view finder. In order to avoid this, view finders have been made having a cross-shaped opening in the view finder, so as to provide two rectangular openings extending across each other at right angles, but here again the operator cannot accurately determine the boundaries of his view or the boundaries of the picture, and hence disappointments very often occur.

The general object of my invention is to provide an attachment for the view finders, so constructed that a rectangular field will always be presented, whether the view finder is turned parallel to the longer axis of the camera, or parallel to the shorter axis of the camera, this rectangular field being, of course, proportionate to the plate used.

A further object is to provide a device of this character which is very simple in construction and consists of only three parts which may be readily assembled and readily put in place upon the ordinary view finder, and which will operate automatically as the view finder is rotated from one position to another to rotate the mask, in which the "field" is cut so as to rotate this mask in correspondence with the picture to be taken.

Other objects will appear in the course of the following description.

My invention is illustrated in the accompanying drawings, wherein:—

Figure 1 is a fragmentary front elevation of a camera with my view finder attachment applied thereto;

Fig. 2 is a top plan view of the view finder with my attachment applied in position for taking "vertical" pictures;

Fig. 3 is a fragmentary side elevation with the view finder rotated to a position to take "horizontal" pictures and with my attachment applied;

Fig. 4 is a fragmentary side elevation like Fig. 3 but showing the view finder in position to take "horizontal" pictures;

Fig. 5 is a face view of the front plate;

Fig. 6 is a top plan view of the cap;

Fig. 7 is a cross section of the cap; and

Fig. 8 is a plan view of the masking plate.

Referring to the drawings, it will be seen that my masking device comprises, in the embodiment illustrated, a front plate 10 of sheet metal, which has a centrally disposed, circular aperture 11 and a downwardly extending portion 12. The circular aperture is notched or cut out at one side so as to provide shoulders 13 disposed in quartering relation to each other. One upper corner of the plate 10 is diagonally extended to form an arm 14 which is longitudinally slotted for the depth of the arm, as at 15.

Adapted to be disposed and fit over the top of the view finder is a cap 16 which is square in form and made of thin sheet metal and provided with an aperture 17 of a size equal to the size of the ground glass of the view finder. This cap has downwardly depending side walls 18 and a depending rear wall 19, and the sides are formed with inwardly projecting, triangular prongs 20 struck up from the sheet metal of the side walls, and adjacent the top of the cap itself with a longitudinally extending slot 21. The rear wall is formed with a corresponding slot 22.

The third element of my device consists of a circular masking plate of thin sheet metal, designated 23, having therein a rectangular aperture 24 having a size proportionate to the photographic plate or film. Attached to the upper face of this circular plate 23 is a wire 25 constituting an arm, which is attached to the face of the plate and then extends slightly above the plate and then extends longitudinally parallel to the long side of the aperture 24 and approximately at the corner of this aperture is extended at an angle of about 45° to the side of the aperture. The plate is formed with a slightly projecting lug 26 on its edge, which coacts with the slots 21 and 22 in the cover plate or cap.

In assembling this device, the front plate 10 is disposed between the lens board A and the view finder B (see Fig. 4). This lens board is ordinarily cut away, at C, in certain forms of cameras and the lug 12 engages in the aperture C and prevents any rotation of the plate relative to the support on board A so that the longer axis of the plate 10 is always disposed in line with the longer axis of the member A and a line extending vertically through the camera. The masking plate 23 is then put in place and rests upon the ground glass of the finder. The arm 25 is disposed through the slot 15 of the front plate. The cap is then put in place, the prongs 20 preventing detachment of the cap. The arm 25, it will be seen, projects out through the circular aperture 17 in the cap and operates over the face of the cap. The lug 26 of the mask plate engages either in the slot 21 or the slot 22, as the case may be. The shoulders 13 on the front plate act as stops for the notch on the view finder to work in.

With the parts disposed upon the view finder as described, then if it be desired to take a vertical picture, that is a picture in which the longer axis of the plate extends vertically, the view finder is shifted so as to bring its ground glass at the top of the camera and the parts of the masking attachment will be disposed as in Fig. 2. If now a horizontal picture is taken, that is a picture in which the longer axis of the plate or film extends horizontally, then the view finder is rotated a quarter turn from the position shown in Fig. 2. The rotation of the view finder a quarter turn carries with it the cap 16 and the mask 23, and as the cap and mask are carried around through this quarter turn, the arm 25 engaging the slot 15 will cause the mask to rotate through a quarter turn, that is from the position shown in Fig. 2 to that shown in Fig. 3. In doing this, the lug 26 will slip out of engagement with the slot 21 and slip into engagement with the slot 22. Of course, upon a reverse movement of the view finder to its initial position, the mask will be again rotated reversely so as to bring the mask again to the position shown in Fig. 2.

It will be seen that my device is very simple, that it is composed of only three parts, and that these may be cheaply constructed and that it may be readily applied to a camera, either with the camera as originally made, or afterward.

While I have shown an embodiment which is particularly adapted to a certain form of camera upon the market, yet it will be obvious that by a slight modification it might be applied to any form of camera having a view finder of the class described. It will be likewise seen that with this device the operator does not himself have to rotate the mask from "its vertical position" to "its horizontal position," but that the mask is automatically shifted to the proper positions.

While I have illustrated only one embodiment of my invention, yet it will be obvious that the invention may be embodied in many different forms without departure from the spirit of the invention.

I claim:—

1. A masking attachment for the view finders of cameras comprising a front plate having an aperture for the finder lens and having an extension diagonal to the long axis of the front plate, the extension being diagonally slotted, said front plate having means whereby it may be held from rotation over the finder, a cap detachably engageable with the top of the finder and having an aperture in the top of the cap, and a masking plate disposed beneath the cap and having a rectangular aperture, the masking plate being rotatable within the cap through a quarter circle and having a diagonally extending arm engageable in the slot of the front plate whereby the masking plate shall be rotated through a quarter circle as the finder is rotated through a quarter circle relative to the front plate.

2. The combination with a photographic view finder including a support, a lens, a reflector, and a glass upon which the image is presented, of a masking attachment therefor comprising a front plate having an aperture and engaging over the lens of the view finder and engaged in said support to hold it from rotation, the front plate being formed at one upper corner with an angularly extending, longitudinally slotted arm, a cap adapted to fit over the top of the finder and the glass thereof and having side walls formed with prongs, said cap having a circular aperture, and a circular masking plate disposed between the glass and the cap and rotatable in this space, said masking plate having a rectangular aperture and an arm projecting radially from the face of the plate and through the cap and engageable in the slot of the arm carried by the front plate.

3. A masking attachment for the view finders of cameras comprising a front plate adapted to fit against the front wall of a finder casing and having an aperture for the finder lens and having means engageable with the camera whereby this front plate may be held from rotation with the finder, a cap adapted to fit over the top of the finder and over the ground glass thereof and having two side walls and a rear wall but being open upon its front, said cap having a circular aperture, and a rotatable, circular masking plate disposed within the cap and having a rectangular aperture, said front plate of the attachment having at one corner an upwardly and outwardly inclined slot, and the masking plate having an arm engageable through said slot whereby the masking plate shall be rotated through a quarter revolution upon the rotation of the view finder through a quarter revolution.

In testimony whereof I hereunto affix my signature in the presence of two witnesses.

GUY R. CALEY.

Witnesses:
JOHN CALEY,
H. B. PIERCE.